United States Patent Office 2,788,340
Patented Apr. 9, 1957

2,788,340

COMPOSITION OF MATTER

Bobby F. Dannels, Tonawanda, N. Y., assignor to Olin Mathieson Chemical Corporation, a corporation of Virginia No Drawing. Application December 26, 1952, Serial No. 328,130

3 Claims. (Cl. 260—94.9)

This invention relates to improvements in polymerizing ethylene. More particularly, it relates to a relatively low pressure process for producing a particular and novel polyethylene product having a molecular weight and a melting range approximating that of present commercially produced polyethylene.

Polyethylene as commercially produced has a relatively sharp melting range of 112–120° C., a tensile strength of about 1700–1900 p. s. i., substantial insolubility in a variety of solvents, and a molecular weight of about 25,000–30,000. In order to obtain polyethylene of such properties, however, it has been necessary to effect the polymerization at about 25,000–50,000 p. s. i. At the low pressures in this range, benzene or other hydrocarbon solvents are used. The higher pressures are necessary when the use of a solvent is avoided. The art, however, fails to teach what combination of operating conditions is necessary to yield polyethylene of consistently high quality.

The improved process of my invention may be operated at a pressure as low as about 4000–6000 p. s. i. and preferably about 5000 p. s. i. Usually it has not previously been possible to obtain polyethylene having a molecular weight as high as 25,000 or a melting range extending above 120° C. in this operating range. It is a particular advantage of my invention that such polymers can be obtained at the relatively low pressure of 5000 p. s. i. since the savings in capital cost of high pressure equipment and in operating costs means a substantial reduction in cost.

In order to obtain consistently at these relatively low pressures, a polymer of ethylene of good quality having a molecular weight of about 25,000 and a melting range extending above 120° C., it is essential to control carefully several factors in the process. The principal elements to be controlled in addition to pressure are temperature, solvents, catalyst and time of contact. The temperature of polymerization may be from about 40 to 55° C. In this range optimum results are obtained by conducting the polymerization in a medium of aqueous alcohol in the presence of an alkyl peroxydicarbonate catalyst. Methanol is the preferred solvent but ethanol and other water soluble lower aliphatic alcohols may be used. The medium suitably comprises from about 10 to 50 percent by weight of the alcohol and 50 to 90 percent of water. Both the alcohol and water are advantageously deoxygenated, for example, by refluxing for two hours in a stream of lamp grade nitrogen. The system may be substantially neutral and still obtain polymer of good quality but conversions are improved if a small amount of an aliphatic acid is added. Suitably the acid should be sufficiently strong to produce a pH in the solution of about 2 to 4. For this purpose acetic acid is particularly useful but other sufficiently strong lower molecular weight aliphatic acids may be used including, for example, formic or trifluoro acetic acid. Usually about 1 to 2 percent of the acid is sufficient to produce the desired pH.

An emulsifying agent may be added to the aqueous alcohol medium. Cationic and anionic emulsifying agents however give lower conversions and result in inferior products of relatively low molecular weight. If an emulsifier is employed therefore it should be a non-ionic material, for example, of the class described as alkyl aryl polyethylene glycols. A suitable example is commercially available under the trade name "Antarox A–200." The proportion of emulsifying agent should be from about 0.2 to 2.0 percent by weight based on the alcohol and water.

The advantages of the present invention are best obtained by the use of diisopropyl peroxydicarbonate as catalyst. However, other alkyl peroxydicarbonates may be substituted in some circumstances and still obtain high quality polymer. Usually from about 0.2 to 0.5 percent by weight of diisopropyl peroxydicarbonate based on the solvent mixture is used. Preferably the peroxydicarbonate supplies substantially all of the oxidizing catalyst for the polymerization and the addition of oxygen dissolved in the solvents or admixed with the ethylene is avoided. Thus deoxygenated water, methanol and acetic acid are preferably used. The ethylene charged advantageously contains less than about 200 parts per million of oxygen. The oxygen content of ethylene may be readily reduced well below this limit by maintaining the ethylene over a body of melted sodium at about 150° C. for two hours. When the peroxydicarbonate catalyst furnishes substantially all the oxygen to the system, it should be used in the proportions of about 0.2–0.5 percent by weight based on the total solvent. With too little catalyst, low conversions are obtained and with too high a catalyst the molecular weight is likely to be low and in extreme cases reaction may be uncontrollable. When the other conditions are controlled as described above, suitable holding times may vary from about 4 to 12 hours.

In operation, ethylene is conveniently maintained in storage at about 2500 p. s. i. The ethylene to be charged should be previously treated to remove oxygen if necessary. In batchwise operation a suitable pressure vessel is charged with solvent, acid and catalyst, and ethylene is introduced at 25° C. to a pressure of about 4000 p. s. i. The weight of ethylene is approximately 85 precent of the weight of the solvent. The temperature is raised to about 40–55° C. and maintained in this range during the reaction period. Additional ethylene is charged to the system as necessary during the reaction to maintain the pressure at about 4700–5200 p. s. i. On completion of the reaction, the pressure is relieved and the product is obtained as a dry white powder on filtering the contents of the pressure vessel. The product has a melting point usually in the range of 120–130° C. and may be formed into flexible sheets by compression. The molecular weight is in the range of 22,000 to 25,000 by the melt viscosity determination. Equipment and materials of construction are conventional to the art. For example, stainless or chromemolybdenum steels are suitable.

Although the low pressure polymer product of my invention closely appropriates the molecular weight range of polyethylene as customarily produced by high pressure reaction, the product is distinctive in its properties and thus represents a novel ethylene polymeric product of special utilities. The product characteristically has a higher melting point and it is harder and more brittle than conventional polyethylene. Although it may be less suitable as a consequence for the uses for which polyethylene is particularly employed, it has a surprising capacity when blended with polyethylene to modify its properties of particular hardness, toughness and heat resistance. Hence the product is a valuable extender for polyethylene, and for many applications where hardness and heat resistance are important the more economical extended product has properties significantly superior to either of its components. Similarly, the low pressure ethylene polymeric product has special capacity for modifying and improving the properties of polyisobutylene, resulting in blended products having properties that are distinctive and superior for more uses than those of either component. In polyethylene and polyisobutylene blends, the product is usually employed in proportions of about 25 to 50 percent although it may be employed under a much wider range of about 10 to 75 percent. The new product also has particular value as a wax additive and, in this application, appears to have decided superiority to the conventional polyethylenes employed as additives for microcrystalline petroleum wax.

The following examples illustrate the manner of preparation and the physical properties of the new low pressure ethylene polymeric product.

*Example I*

A stainless steel lined autoclave having means for agitation of the contents was swept out with lamp grade nitrogen and charged with a solution of 380 parts of deoxygenated distilled water, 120 parts of deoxygenated C. P. methanol and 10 parts of glacial acetic acid. Diisopropyl peroxydicarbonate (2.5 parts) was then added and the autoclave was closed and evacuated. C. P. ethylene, purified over sodium at 150° C. for two hours, was introduced at room temperature to a pressure of 4000 p. s. i. The autoclave and contents were then heated to 45° C. and the temperature was maintained at that point for 12 hours. The pressure rose to a maximum of 5200 p. s. i. and was maintained between the limits of 4700 and 5200 p. s. i. by the addition of ethylene as necessary. The total pressure drop during 12 hours was 5740 p. s. i. On releasing the pressure and opening the autoclave, the product appeared floating on a clear solution. It was obtained as a dry white powder by filtering, washing with water and methanol and drying at 70° C. for 16 hours. The polymer thus obtained weighed 125 g. and had a melting range of 119–130° C. and a molecular weight of 25,000. This polymer could be molded into tough flexible films.

*Example II*

The procedure of Example I was repeated except that the temperature was maintained at 40° C. The total pressure drop during 12 hours was 2680 p. s. i. The product had a melting range of 118–150° C. and a molecular weight of greater than 25,000. A flexible film was molded from this polymer.

*Example III*

An autoclave fabricated of Hastelloy C was charged with 118 parts of water, 93 parts of methanol, 7.5 parts of acetic acid and 1.9 parts of diisopropyl peroxydicarbonate. The vessel was closed, evacuated and charged with ethylene as described in Example I. It was maintained at 50° C. for 5 hours, the pressure ranging from 4600–5200 p. s. i. The total pressure drop was 3610 p. s. i. The product, separated as described in Example I, had a melting range of 119–123° C. and a molecular weight of 25,000. The molded film was tough and flexible.

*Example IV*

A rocking type autoclave with stainless steel liner was swept out with lamp grade nitrogen and charged with a solution of 380 parts of deoxygenated distilled water, 120 parts of deoxygenated C. P. methanol and 2 parts of Antarox A-200. Diisopropyl peroxydicarbonate (2.5 parts) was added and the autoclave was closed and evacuated. C. P. ethylene, purified over sodium at 150° C. for two hours was introduced at room temperature to a pressure of 4000 p. s. i. The autoclave and contents were then heated to 50° C. and maintained at that temperature for 5 hours. The pressure rose to a maximum of 5200 p. s. i. and gradually dropped to 3600 p. s. i. The pressure was released and the white slurry was filtered, washed with hot water and methanol and dried at 70° C. for 16 hours. The polymer thus obtained amounted to 65 parts by weight. It had a melting range of 115–118° C. and a molecular weight of 17,000. It could be molded into tough flexible films.

*Example V*

A composite of the products of several runs made under the conditions of Example I and having a melting range of 117–126° C. and a melt index of 0.8 was prepared and blended with commercial polyethylene. A blend of equal parts by weight showed a melting range of 110–130° C. and a melt index of 1.4 compared to 1.8 for commercial polyethylene. These values indicate enhanced heat resistance and make the product more suitable for applications involving higher temperatures than can be used with present commercial polyethylene. The 50–50 blend showed a tensile strength of 2400 p. s. i., an elongation of 125 percent and an M. I. T. fold test of 2380. The addition of the product of this invention modified the soft rubbery properties of commercial polyethylene to give it greater hardness and decreased flexibility. This is advantageous in the fabrication of dishes, ice cube trays and similar articles in which thinner walls give equal mechanical strength and better heat conductivity.

A blend of 25 percent of the composite polymer with 75 percent of commercial polyethylene gave a composition of intermediate properties having a melting range of 110–149° C., a melt index of 1.6, a tensile strength of 1650 p. s. i., elongation of 400 percent and M. I. T. fold test of 2980.

*Example VI*

The composite ethylene polymer of Example V was blended with an equal weight of polyisobutylene to obtain a composition having a melting range of 110–186° C., a melt index of 0.3, tensile strength of 675 p. s. i., elongation of 125 percent and an M. I. T. fold test of 665. The rubbery, soft polyisobutylene was thus converted to a tough thermoplastic polymer which resembles polyethylene more than either of its components. It can be compression molded, injection molded or extruded.

The 50–50 blend of the product of this invention with polyisobutylene was applied in a 1 mil coating on 50 pound kraft paper and compared with a similar coating of a 50–50 blend of commercial polyethylene and polyisobutylene and the uncoated paper. The bursting strength of the uncoated paper was 52 pounds. Coated with the commercial polyethylene composition the bursting strength was 58 pounds and coated with composition of polyisobutylene with the product of this invention was 61 pounds. The folding endurance of the untreated paper across the grain was 272 and with the grain was 111. Coating of the paper with the product of the present invention raised the folding endurance to 414 and 220 respectively. The folding endurance of the paper coated with the polyisobutylene-commercial polyethylene composition could not be measured since the paper failed but the coating film gradually stretched giving false readings.

*Example VII*

A wax composition suitable for paper coating was prepared by blending 5 parts of the composite ethylene polymer described in Example V with 2 parts of "Dymerex," a composition of dimeric rosin acids and 93 parts by weight of microcrystalline wax. Applied in a 3 mil thick coating to 40-pound kraft paper, the M. I. T. folding endurance at 30° C. was raised from 272 across the grain to 316 and from 111 with grain, reduced to 82. The Mullen bursting strength in pounds per square inch was raised from 48 to 56. Tensile strength in pounds per square inch across the grain was reduced from 23.1 to 21.4 and with the grain was raised from 9.6 to 11.1. The Elmendorf tear test in grams was raised from 154 across the grain to 205 and from 197 with the grain to 240. The water vapor transmission was 0.052 gram per hundred square inches per 24 hours at 30° C.

I claim:

1. A process for production of a hard ethylene polymeric product of relatively high melting range and high molecular weight which comprises polymerizing ethylene in an aqueous alcohol reaction medium in the presence of a small amount of a diisopropyl peroxydicarbonate catalyst under conditions of about 4000 to 6000 p. s. i. and about 40 to 55° C.

2. The process of claim 1 in which the reaction medium comprises aqueous methanol.

3. A process for production of a hard ethylene polymeric product of relatively high melting range and high molecular weight which comprises polymerizing ethylene in an aqueous alcohol reaction medium containing a nonionic emulsifying agent and in the presence of a small amount of a diisopropyl peroxydicarbonate catalyst under conditions of about 4000 to 6000 p. s. i. and about 40 to 55° C.

References Cited in the file of this patent

UNITED STATES PATENTS

| | | |
|---|---|---|
| 2,402,137 | Hanford | June 18, 1946 |
| 2,475,643 | Seebold | July 12, 1949 |
| 2,475,648 | Stoner | July 12, 1949 |
| 2,504,400 | Erchak | Apr. 18, 1950 |
| 2,685,577 | Cerveny et al. | Aug. 3, 1954 |